Figure 1:
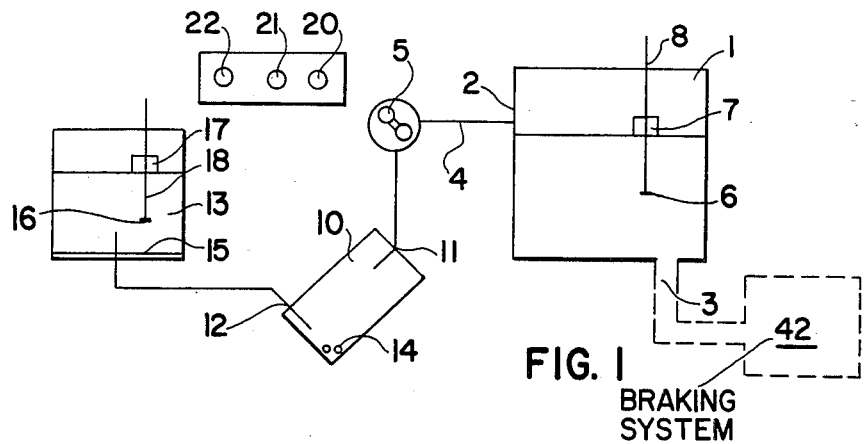

United States Patent [19]

Castell-Evans

[11] Patent Number: 4,595,341

[45] Date of Patent: Jun. 17, 1986

[54] FLUID SUPPLY APPARATUS INCLUDING PLURAL RESERVOIRS AND CONDITION RESPONSIVE CONTROL OF PUMP DRIVE MOTOR BY CONTAMINANT SENSING PROBES

[75] Inventor: John V. Castell-Evans, Toddington, England

[73] Assignee: Rolls-Royce Motors Limited, Crewe, England

[21] Appl. No.: 627,620

[22] Filed: Jul. 3, 1984

[30] Foreign Application Priority Data

Jul. 6, 1983 [GB] United Kingdom ............... 8318255

[51] Int. Cl.$^4$ ..................... F04B 49/00; F04B 21/00
[52] U.S. Cl. .......................................... 417/1; 417/12; 417/40; 417/44; 417/63; 417/474; 340/620; 73/308; 137/551
[58] Field of Search ............... 417/1, 12, 36, 40, 44, 417/45, 63, 474; 340/602–604, 620; 307/118; 361/178; 137/551, 575; 73/291, 304 R, 308

[56] References Cited

U.S. PATENT DOCUMENTS

| | | | |
|---|---|---|---|
| 2,246,594 | 6/1941 | Kinsella | 417/40 X |
| 2,260,312 | 10/1941 | Grumar | 417/36 |
| 2,463,703 | 3/1949 | Legler | 417/44 X |
| 2,716,165 | 8/1955 | Pfitzner | 340/631 X |
| 2,910,940 | 11/1959 | Colman et al. | 417/63 X |
| 3,084,708 | 4/1963 | Herrero | 417/36 X |
| 4,129,501 | 12/1978 | Haynes | 340/604 X |
| 4,171,932 | 10/1979 | Miller | 417/12 X |
| 4,492,531 | 1/1985 | Kenji et al. | 417/477 X |

FOREIGN PATENT DOCUMENTS 2065336 6/1981 United Kingdom ............... 340/620

Primary Examiner—William L. Freeh
Assistant Examiner—Paul F. Neils
Attorney, Agent, or Firm—Cushman, Darby & Cushman

[57] ABSTRACT

An automobile hydraulic braking circuit comprises two reservoirs in addition to the main hydraulic fluid reservoir. One additional reservoir can replenish the other which in turn can replenish the main hydraulic reservoir. A peristaltic pump controls fluid flow to the main reservoir from the adjacent additional reservoir. Probes in the additional reservoirs operate in conjunction with control circuitry to inhibit operation of the pump to prevent contaminated fluid from being supplied to the main reservoir.

9 Claims, 7 Drawing Figures

FLUID SUPPLY APPARATUS INCLUDING PLURAL RESERVOIRS AND CONDITION RESPONSIVE CONTROL OF PUMP DRIVE MOTOR BY CONTAMINANT SENSING PROBES

The present invention relates to fluid supply apparatus and particularly, but not exclusively, to a fluid supply apparatus for, or forming part of, a vehicle braking system.

At the present time, both conventional synthetic brake fluid (hereinafter referred to as synthetic oil) and hydraulic system mineral oil (hereinafter referred to as mineral oil) are in general use for braking systems. The use of synthetic oil is more widespread than that of mineral oil, but mineral oil is more advantageous because it is less hygroscopic than synthetic oil. Also, mineral or synthetic oil is used in some vehicle suspension systems, and the use of the same oil for both the suspension and braking system permits a common supply. Unfortunately, the two oils are incompatible. Not only do they differ in specific gravity, and separate out from one another as a result, they also require seals made of different materials. Thus, if synthetic oil is introduced in a braking system working on mineral oil, the synthetic oil will contaminate the mineral oil which may eventually contaminate the oil seals causing them to deteriorate. Such systems, once contaminated, can be difficult, time consuming and expensive to decontaminate. Furthermore, there is a potential hazard that the braking system would be lost.

According to the present invention, there is provided fluid supply apparatus comprising a first fluid reservoir, a second fluid reservoir, a fluid connection between the two reservoirs, a pump disposed in the connection for pumping fluid from the first to the second reservoir, probes in the first fluid reservoir for sensing the presence of an electrically conductive contaminant and control circuitry for preventing operation of the pump when a contaminant is sensed.

In a preferred embodiment of the invention the fluid supply apparatus is part of an automobile braking circuit. An intermediate tank is disposed in the fluid connection between the two reservoirs, between the first reservoir and the pump. This intermediate tank also contains probes for sensing the presence of an electrically conductive contaminant. These probes, like the probes in the first reservoir, feed signals to the control circuitry. The control circuitry comprises relays having contacts disposed in the electrical supply circuit to the pump. One of these relays is operative to cause the pump to operate to replenish fluid lost from the second reservoir with fluid from the intermediate tank and another is operative to prevent operation of the pump in the event contaminant is sensed by either the probes in the first reservoir or the intermediate tank. The control circuitry comprises light emitting diodes or other visual indicators to indicate the operative condition of the apparatus. A delay circuit may be provided to inhibit pump operation until a contaminant condition had existed for a certain minimum time period.

Advantageously, the pump is a peristaltic pump. With such a pump the moving parts of the pump are isolated from the material being pumped. Furthermore, the pump acts as a non-return valve.

In order that the invention may be more clearly understood, one embodiment thereof will now be described, by way of example, with reference to the accompanying drawings, in which:

FIGS. 1 to 4 respectively diagrammatically show a part of a vehicle braking circuit modified in accordance with the invention, under four different operating conditions.

Figure 3:
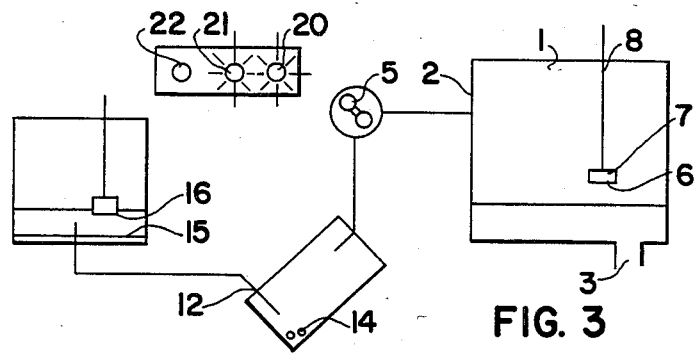
Figure 4:
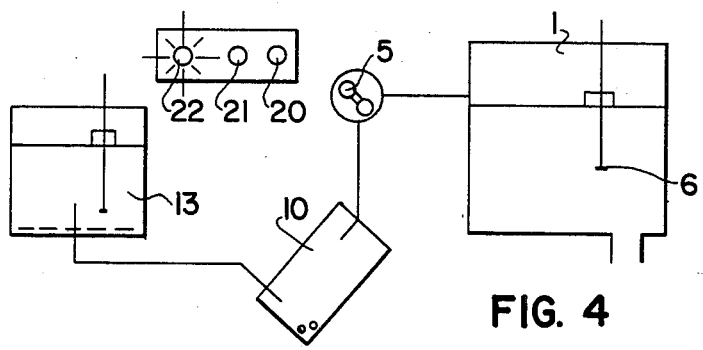
Figure 5:
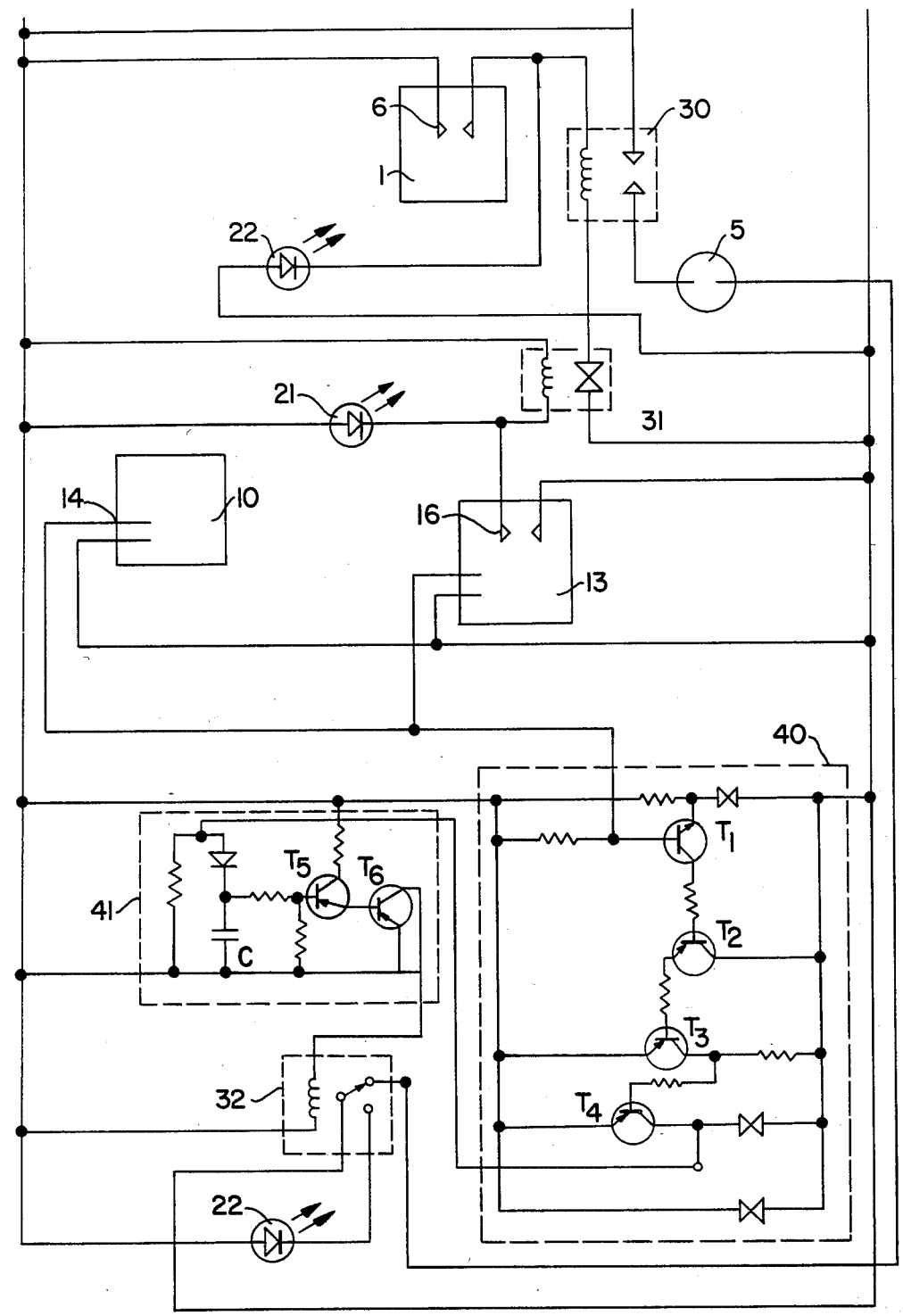

FIG. 5 is a circuit diagram of circuitry forming part of the modified vehicle braking circuit of FIGS. 1 to 4, and FIGS. 6 and 7 shows perspective views of possible forms of reservoir or tank for the apparatus of FIGS. 1 to 4.

Referring to FIGS. 1 to 4, the brake fluid supply reservoir of an automobile braking system is shown at 1. This reservoir 1 defines a fluid inlet at 2 and a fluid outlet at 3. The inlet 2 is connected via a fluid line 4 to a peristaltic pump 5 and the outlet 3 is connected to the remainder of the braking system 42 shown in phantom. The reservoir contains a float actuated reed switch 6, the float 7 of which is supported by the fluid in the reservoir. The upward and downward movement of the float 7 is guided by a guide 8.

Figure 6:
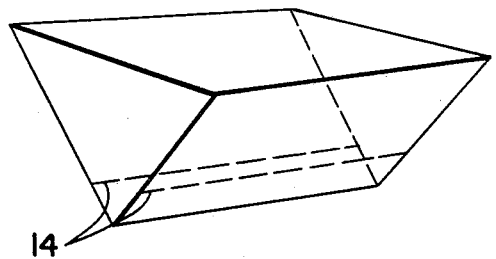
Figure 7:
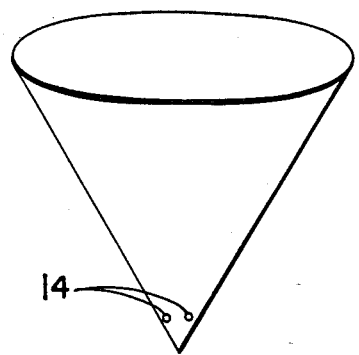

The inlet of the pump 5 is connected to the outlet 11 of an intermediate tank 10. The inlet 12 of this tank 10 is connected to the outlet 19 of a primary reservoir 13. The outlet 11 is disposed towards the top of the tank 10 and the inlet 12 towards the bottom. Both the tank 10 and reservoir 13 contain sensor probes 14 and 15 disposed at their bases for a purpose to be described later. Reservoir 13 also contains a float activated reed switch 16, the float 17 of which is supported by the fluid in the reservoir 13. The upward and downward movement of the float is guided by a guide 18. A series of three warning lights 20, 21 and 22 (light emitting diodes), adapted for disposition in the dashboard of the automobile are provided. To accommodate the probes 14 and 15 in the respective tank 10 and reservoir 13, the bases of the tank and reservoir are advantageously of V-shaped cross section. They may, for example, be in the shape of a trough, in which case the probes will be linear extending along the trough as shown in FIG. 6, or they may be in the shape of a cone in which case the probes may be in stud form as shown in FIG. 7. The probes are made of stainless steel (18% chromium 8% nickel). Stainless steel was chosen so as to avoid any resistance changes on the surface of the probes due to development of oxides. Noble metals would also be suitable.

Figure 2:
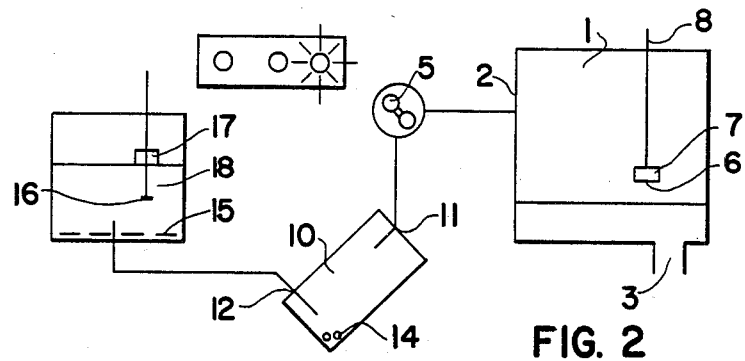

The operation of the above described system will now be described with additional reference to the circuit diagram of FIG. 5. The system is shown in FIG. 1 in its normal operational condition, that is with tank 10 full in mineral oil and with mineral oil at a high level in reservoirs 1 and 13. Operation of the system is dependant on the fact that mineral oil is an electrical insulator whereas a contaminant, such as, synthetic oil is electrically conductive. With only mineral oil in the system, and at its correct levels, reed switches 6 and 16 will not be operated and an electrical bridge will not occur across the probes 14 or the probes 15. None of the relays 30, 31 and 32 will be actuated and the pump 5 and the lights 20, 21 and 22 will remain off. If a leak occurs in the system, the float 7 will fall as the level in reservoir 1 falls, closing the reed switch 6 which in turn closes the supply circuit to the coil of relay 30 to operate this relay. The contacts of relay 30 close to complete the supply circuit to the peristaltic pump 5. The pump 5 then operates to pump mineral oil into the reservoir 1 from the intermediate tank 10 until the level of oil in reservoir 1 is raised sufficiently to raise float 7, open the reed switch 6 and thereby de-energise the relay to switch off the pump 5. Whilst reed switch 6 is closed, the supply circuit to light 20 is also completed to light this light whilst pump 5 is on. This condition is shown in FIG. 2.

As mineral oil is drawn from tank 10, the tank 10 is replenished under gravity from reservoir 13. This causes the oil level in reservoir 13 to fall and the float 17 falls with it. At a preset low level, the float 17 actuates the reed switch 16. Actuation of this reed switch closes the supply circuit to the coil of relay 31 thereby opening the contact of that relay thus breaking the supply circuit to the coil of relay 30 and preventing operation of the peristaltic pump 5. Closure of reed switch 16 also completes the supply circuit to light 21 which then lights to indicate a low level in reservoir 13. This condition is shown in FIG. 3. Reservoir 13 may then be replenished manually from an external source of mineral oil.

If the mineral oil is contaminated with synthetic oil, for example by erroneously introducing such oil to reservoir 13, this sinks to the bottom of reservoir 13 as its density is 1:01±0.005 g/ml compared with 0.95±0.005 g/ml for mineral oil. At the bottom of the reservoir, the synthetic oil forms an electrically conductive bridge across the probes 15. This results in negative potential being placed on the base of $T_1$ which switches off $T_2 \times T_3$ allowing $T_4$ to conduct, the output of $T_4$ is connected through a delay unit 41 to relay 32. This unit 41 comprises two cascaded NPN transistors $T_5$ and $T_6$ and a capacitor C whose capacitance determines the value of the delay. The purpose of the time delay is to stop the pump 5 for seven seconds (or other selected time period) to allow conditions to stabilise. If the contaminant precipitates (settles) then the pump 5 is permanently inhibited. Light 22 is lit when the relay 32 operates to indicate presence of contaminant and inhibition of the pump circuit. The contacts of relay 32 are disposed in the supply circuits to the pump 5 and the light 22 so that energising of the relay causes the supply circuit to the pump 5 to be broken and the light 22 to be illuminated. Similar action follows if contaminant provides an electrical bridge across the probes 14 in tank 10. This condition is shown in FIG. 4.

Thus with the above described arrangement, warning is given of contaminant before it enters the main braking system and the pump for transferring oil to the main system is prevented from operating. Apart from detecting discrete droplets of contaminant, the system will also cater for contaminant synthetic oil which is thoroughly mixed with mineral oil for when introduced into reservoir 13 it will normally stay in the reservoir 13 or tank 10 for a sufficient time for the synthetic oil to separate out from the mineral oil and bridge the probes 14 or 15. It has been found, for example, that 1% of synthetic oil contaminant in 250 ml of mineral oil will be detected by the probes after twelve hours. Lower contaminant concentrations will normally require longer periods for detection.

A peristaltic pump has particular advantages in this application for not only are the moving parts of the pump isolated from the field being pumped, but also the pump acts as a non-return valve. These modifications to the normal brake fluid circuit may be conveniently disposed adjacent the normal brake fluid reservoirs in the engine compartment of the automobile.

It will be appreciated that the above embodiment has been described by way of example only and that many variations are possible without departing from the scope of the invention.

What is claimed is:

1. Fluid supply apparatus comprising: a first fluid reservoir; a second fluid reservoir; a fluid connection between the two reservoirs; an intermediate tank disposed in the fluid connection between the two reservoirs; a pump disposed in the connection for pumping fluid from the first to the second reservoir; probes in the first fluid reservoir and in the intermediate tank for sensing the presence of an electrically conductive contaminant; and control circuitry for preventing operation of the pump when a containment is sensed.

2. Fluid supply apparatus as claimed in claim 1, in which the intermediate tank is disposed between the first reservoir and the pump.

3. Fluid supply apparatus as claimed in claim 1, in which an intermediate tank is disposed in the fluid connection between the first and second reservoirs, probes are positioned in the intermediate tank for sensing the presence of an electrically conductive contaminant and control circuitry comprising relays disposed in the electrical supply circuit to the pump, one of the relays being operative to cause the pump to operate to replenish fluid lost from the second reservoir with fluid from the intermediate tank and another being operative to prevent operation of the pump in the event a contaminant is sensed by either the probes in the first reservoir or in the intermediate tank.

4. Fluid supply apparatus as claimed in claim 1, in which control circuitry receives signals from the probes and controls operation of the pump in dependence upon the signals received.

5. Fluid supply apparatus as claimed in claim 4, in which the control circuitry comprises relays disposed in the electrical supply circuit to the pump.

6. Fluid supply apparatus as claimed in claim 5, in which the control circuitry comprises an indicator for indicating the operative condition of the apparatus.

7. A vehicle breaking circuit having a fluid supply apparatus comprising a first fluid reservoir, a second fluid reservoir, a fluid connection between the two reservoirs, an intermediate tank disposed in the fluid connection between the two reservoirs, a pump disposed in the connection for pumping fluid from the first to the second reservoir, probes in the first fluid reservoir and in the intermediate tank for sensing the presence of an electrically conductive contaminant, and control circuitry for preventing operation of the pump when a contaminant is sensed.

8. Fluid supply apparatus comprising:
a first fluid reservoir; a second fluid reservoir; a fluid connection between the two reservoirs; an intermediate tank disposed in the fluid connection between the two reservoirs; a peristaltic pump disposed in the connection for pumping fluid from the first to the second reservoir;
probes in the first fluid reservoir and in the intermediate tank for sensing the presence of an electrically conductive contaminant; and control circuitry for preventing operation of the pump when a contaminant is sensed.

9. A fluid supply apparatus comprising:
a first fluid reservoir; a second fluid reservoir; a fluid connection between said two reservoirs; an intermediate tank disposed in the fluid connection between the two reservoirs; a pump disposed in the connection for pumping fluid from the first to the second reservoir; probes in the first fluid reservoir and in the intermediate tank for sensing the presence of an electrically conductive contaminant; and control circuitry for preventing operation of the pump when a contaminant is sensed, said control circuitry including a delay circuit for inhibiting pump operation until a contaminant condition has existed for a predetermined minimum period of time.

* * * * *